US010731356B2

(12) United States Patent
Minze

(10) Patent No.: US 10,731,356 B2
(45) Date of Patent: Aug. 4, 2020

(54) BOTTLE CAP BACKSPLASH ASSEMBLY METHOD FOR USE

(71) Applicant: Christopher James Minze, Spring, TX (US)

(72) Inventor: Christopher James Minze, Spring, TX (US)

(*) Notice: Subject to any disclaimer, the term of this patent is extended or adjusted under 35 U.S.C. 154(b) by 0 days.

(21) Appl. No.: 15/812,534

(22) Filed: Nov. 14, 2017

(65) Prior Publication Data

US 2019/0127988 A1 May 2, 2019

Related U.S. Application Data

(62) Division of application No. 15/339,294, filed on Oct. 31, 2016, now abandoned.

(51) Int. Cl.
| | |
|---|---|
| *E04F 13/09* | (2006.01) |
| *E04F 13/08* | (2006.01) |
| *B32B 3/16* | (2006.01) |
| *B32B 5/02* | (2006.01) |
| *E04F 13/12* | (2006.01) |

(52) U.S. Cl.
CPC .......... *E04F 13/0862* (2013.01); *B32B 3/16* (2013.01); *B32B 5/028* (2013.01); *E04F 13/0885* (2013.01); *E04F 13/09* (2013.01); *E04F 13/12* (2013.01); *B32B 2419/04* (2013.01)

(58) Field of Classification Search
CPC .. B44C 3/123; B32B 3/14; B32B 9/00; B32B 2419/04; E04F 13/0862; E04F 13/08
See application file for complete search history.

(56) References Cited

U.S. PATENT DOCUMENTS

| | | | |
|---|---|---|---|
| 2,697,019 | A | 12/1954 | Stefan |
| 3,335,048 | A | 8/1967 | Morain |
| 4,554,769 | A | 11/1985 | Fujii et al. |
| 4,804,569 | A | 2/1989 | Arisawa |
| 5,330,262 | A | 7/1994 | Peters |
| 5,458,253 | A | 10/1995 | Shapcott |
| 5,733,022 | A | 3/1998 | Whetstone |
| 6,330,774 | B1 | 12/2001 | Weinstein |
| 8,464,484 | B1 | 6/2013 | Claramonte |
| 8,539,736 | B1 | 9/2013 | Claramonte |
| 8,887,462 | B2 | 11/2014 | Tatari |
| 8,980,426 | B2 | 3/2015 | Farrage et al. |
| 2004/0093819 | A1 | 5/2004 | Ritzer |
| 2005/0246989 | A1 | 11/2005 | Pringle et al. |
| 2006/0003132 | A1 | 1/2006 | Correia et al. |
| 2011/0239572 | A1 | 10/2011 | Calapkulu |
| 2014/0102022 | A1 | 4/2014 | Carter et al. |

*Primary Examiner* — Gisele D Ford
(74) *Attorney, Agent, or Firm* — William Yarbrough

(57) ABSTRACT

A method for installing repurposed bottle caps in the form of a tile construction sheet to a prepared support surface such as a kitchen, "wet bar", or bar, backsplash. In addition these sheets can be made to accommodate installation in various other applications including bartops and table tops. Each sheet will exhibit a number of evenly spaced bottle caps affixed to a mesh woven substrate layer that is made to accept these bottle caps in a perpetual stationary state and which allows for installation to a fixed surface in a timely manner using industry standard materials and practices.

3 Claims, 7 Drawing Sheets

BOTTLE CAP BACKSPLASH ASSEMBLY METHOD FOR USE

BACKGROUND OF THE INVENTION

Field of the Invention

The present invention relates to a bottle cap backsplash assembly system and method for use, and more particularly, to a prefabricated backsplash assembly system whereby a series of repurposed bottle caps are placed and adhered onto an adhesive mesh backing, positioned in a uniform and equally-spaced manner, and the mesh backing is made to adhere to an accepting vertical or horizontal surface of a kitchen, wet-bar, bar or other decorative area allowing for timely coverage, of large areas via commercial or residential installation.

Description of Related Art

It has long been traditional and customary for a skilled backsplash installer to first sand and prepare the vertical surface of a kitchen, bathroom, or wet bar to achieve a surface that is both smooth and absent of aberrations, level, and evenly accepting of an adhered tile. Next, the installer would clean the surface area with a grease-cutting solution or similar detergent (e.g. trisodium phosphate) to insure that the newly prepared area is both clean and absent of any foreign material that would act as a barrier between the vertical surface and the tile to be installed. The installer would subsequently utilize a bonding agent (or bi-adhesive mesh mat) to install single tile pieces, and saw cut partial pieces, in a precise and uniform manner to give the impression of a single, congruous tiled surface. Finally, the pieces are fixed in a stationary state via caulk and grout, together with manual pressure, to create a permanent suspension in which a complete backsplash is established.

This process not only requires extensive skill and knowledge but also specialized tools and equipment with which to install a backsplash that must be customized to conform to the space available. In addition, the tediousness of installation lends itself readily to long installation times that are best described in hours and realistically, and more accurately, defined in days.

Moreover, as is detailed by the present invention, the installation of individually placed tiles (and here bottle caps) uniformly into a backsplash design adds a level of complexity to traditional tile installation that is more tedious, more complex, and more deserving of an acute exacting attention. Clearly, the intricacies of bottle cap placement suffer from even greater infirmities than that of tile placement in that bottle caps lack clearly defined, flat edges with which to "square" subsequently placed tiles, bottle caps are orientation specific with regards to embossed wording and depictions, and bottle caps require greater attention to detail with placement to insure that each cap to equidistant from each surrounding cap, installed straight to the project centerline, and flush to a distance equal to the surrounding height of all other caps. Furthermore, the installer is burdened with obtaining the necessary materials (bottle caps of each desired manufacturer in a uniform size) and devising an adhesion method that is most conducive to cap adherence.

Accordingly, current practices and industry standards of expertise do not allow the skilled craftsman (or willing "do it yourselfer") any time efficient, ergonomic, and economical means with which to install a bottle-cap backsplash that exhibits the requisite level of uniformity and spacing while equally providing a product that is visually pleasing. As detailed above, the precise and taxing installation of a bottle cap backsplash is so exceedingly complex as to supersede the value it would produce for the home or bar owner.

Unmistakably, installing recycled bottle caps individually over a large surface area can be complicated, time consuming, and costly. To obtain the necessary materials one has to collect individual bottle caps, uniform the size, devise an adhesion method, and insure each cap is installed straight and square to the project center line. The process, as defined, is tedious and complicated to the point of impractibility. It is the primary goal of the present invention to advance an invention, together with a system of installation, by which a professional or a "do-it-yourselfer" can equally enjoy the accomplishment of an esthetically pleasing backsplash installation with a consistency and uniformity that has until now eluded the backsplash installer.

BRIEF SUMMARY OF THE INVENTION

The present invention relates to a retail-ready, prefabricated assembly system in the form of square (or square-type) tile-styled sheets consisting of equally spaced bottle caps and a mesh, woven backing designed to accept a plurality of bottle caps to be adhered to an accepting vertical surface such as, but not limited to, a kitchen, "wet bar", bar back or the horizontal surface of a table or bar in a uniform pattern. The present invention further describes a method of installing bottle cap adorned mesh, woven sheets to assure, through proper and directed placement, a linear placement of a multiplicity of sheets to give the appearance of a single congruous unit of regimented bottle caps.

In essence, the assembly system that is the present invention consists of bottle cap bearing sheets ranging from one to a plurality of square mesh-backed sheets displaying permanently affixed bottle caps in an outward facing, predetermined and esthetically pleasing configurations (e.g. linear patterns, off-set rows, geometric configurations, repeating patterns, and the like), together with a woven mesh support backing that is designed for the permanent placement to a vertical or horizontal surface. The woven mesh can exist in the present invention as an adhesive accepting surface or may be prepared with a tacky adhesive during manufacture and prior to shipping that expresses a paper, or plastic, release liner that is coated on one or both sides with a release agent and is adhered to the rearward facing area of the adhesive mesh to prevent premature adherence to any unintended surfaces.

In one preferred embodiment, the bottle cap assembly sheets is an assembled bottle cap backsplash that is an approximately 12 inch by 12 inch square tile-style sheet. Each sheet includes approximately 121 equally dimensioned bottle caps that are placed in equal space relation to the next adjacent cap, secured square to the center line, and bound to a woven fiber fabric material that forms the substrate for bottle cap adherence (via an industrial hot melt adhesive) to an accepting surface. Each sheet utilizes a thin set mortar adhesive for ultimate installation. A grout float would subsequently be employed to fill in preexisting grout channels and grout junctions between each cap, grout is then allowed to dry, and excess grout is removed by sponge and water.

In another embodiment, tile-like sheets are created in essentially a square formation except that each left and right edge express bottle cap-bearing extensions that protrude out and away from the sheet to form a tongue which is made to communicate with an adjacent groove of the next adjoining sheet. In this interlocking sheet system, if the original sheet is installed level, each subsequent sheet will be correspondingly level and properly aligned. Accordingly, after the first sheet is properly placed and adhered with a thin set mortar, each subsequent sheet is correspondingly placed and set with a thin set mortar until the desired area is completely covered with the bottle cap sheet assembly system. Finally, grout is applied, allowed to dry, and pre-placed bottle caps are removed of excess grout via a sponge and water.

In yet another embodiment, the woven fiber fabric material that is used to accept the bottle caps is made to demonstrate a self-adhesive, "sticky" application that allows the backsplash sheet to be adhered to an accepting surface with minimal pressure. This pretreated woven, mesh can be integrated into the square and the "tongue and groove" interlocking system alike and made to communicate with a release liner that is a paper or plastic film sheet used to assure that the adhesive application is not prematurely actuated, during shipping or otherwise, before its intended use. Once the bottle cap sheet is placed in an acceptable configuration, the installer can apply progressively greater pressure to affix the bottle cap sheet in a more permanent state prior to grout application.

The heretofore described bottle cap backsplash assembly system, provide craftsmen and "do-it-yourselfers" alike the ability to accomplish a bottle cap backsplash that is an uncomplicated, uniform, and cost and time effective method of placement and final installation method in a manner that is defined below.

In detail, the pre-installation method includes the following steps: (1) assuring that the vertical and/or horizontal surface is dually cleaned of any material or foreign objects that would serve as an impedance to sheet placement and smoothed or "floated out" to be level to zero, (2) measuring the prepared area to determine the size and shape of the required sheet to be adhered and installed, (3) cutting the woven, mesh backing, by a cutting blade or other similar article, to create the size and shape of the sheet required (as determined by the installer), (4) augmenting each assembly sheet requiring a half cut or where a split row is required, and, finally, (5) dry fitting each individual sheet to the surface area to be covered to assure proper sheet application and adherence prior to final application.

In the case of a completely square sheet, the placement of the first sheet is critical. Level placement of the square sheet allows for the proper placement of the next subsequent sheet by abutting each edge flush to the next. Level placement of the "tongue and groove" interlocking sheet assures that the corresponding groove(s) and tongue(s) of subsequent sheets match in a conforming manner that establishes a substantially linear alignment of all sheets.

Equally important, the installer needs to be mindful that each sheet is maintained and installed in an upright position that ensures that all wording and lettering exhibited by each bottle cap is properly read and right side up.

Next, as is observed in the installation method, the first placed bottle cap sheet would need to be adhered to the desired surface, either through a thin set mortar or through a pre-applied self-adhesive backing, that mirrors and is essentially identical to the dry fitting application. The use of a leveler or similar device is recommended to safeguard against tilt but is left to the discretion of the installer. In the case of a thin set mortar, sheet placement may be adjusted through manual movement of the sheet within the mortar. Self-adhesion application, though, is best accomplished through dry fitting and establishing the perimeters of sheet placement within the desired area, fixing the sheet in a stable and desired position, and removing a sufficient amount of release liner to allow single-side attachment to a chosen edge or corner. Once a single edge is securely affixed to the desired surface (preferably from the top or side edge), the installer may then hold firmly the attached portion while reaching behind the unfixed portion of the sheet, remove the remainder of the release liner, and permanently adhere the balance of the bottle cap sheet to the specified support surface through the application of pressure consistently across the entire outfacing surface of the sheet until the sheet reaches a desired and uniform placement.

Each subsequent bottle cap sheet, whether flush sided or of a "tongue and groove" interlocking means, gains the benefit of a properly placed first sheet in that the prior primary level sheet placement results in subsequent secondary sheet level placements that are accurately and effectively aligned. Yet, the use of a level intermittently is further recommended throughout installation.

Finally, as is especially true in the case of the thin set motor, the means of attachment are allowed to set and cure. Once the sheets are secured and fixed, grout is effectively used to fill in the space existing between the bottle caps, through the spaces existing within the woven material, and to the accepting surface, albeit a wall or a flat surface (e.g. a table or bar). Excess grout is then removed via a sponge and water leaving only the bottle cap faces exposed. After the grout has dried, the entire surface is sealed and the bottle caps are polished to enhance the back splash's overall visual appeal.

DETAILED DESCRIPTION OF THE INVENTION

The following detailed description is of the best currently contemplated modes of carrying out exemplary embodiments of the present invention. While the specification concludes with claims defining what it is inventor deems as his invention, it is believed that the invention is best understood when taken in conjunction with the drawings and detailed description. Yet, the detailed description is not to be taken in a limiting sense, but rather is made merely for the purpose of illustrating the general principles of the invention, since the scope of the invention is best defined by the appended claims and diagrams. Moreover the terms and phrases used herein are not intended for the purpose of limiting the invention description, but rather to provide a clear understanding of the invention to allow those who are skilled in the art to make and practice the same.

Figure 1:
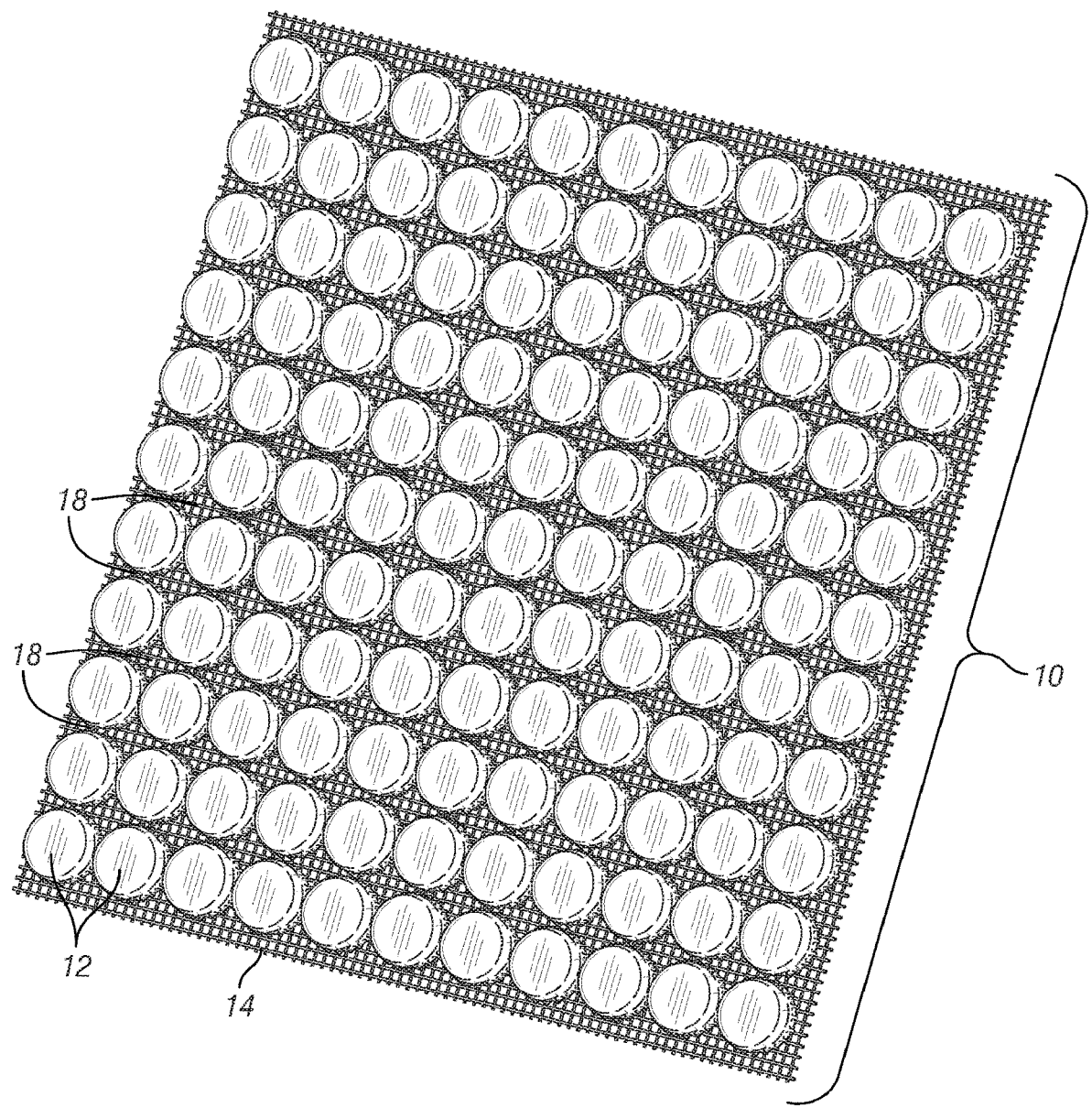
FIG. 1 is a detailed elevated perspective schematic side view of the bottle cap backsplash assembly.
Figure 2:
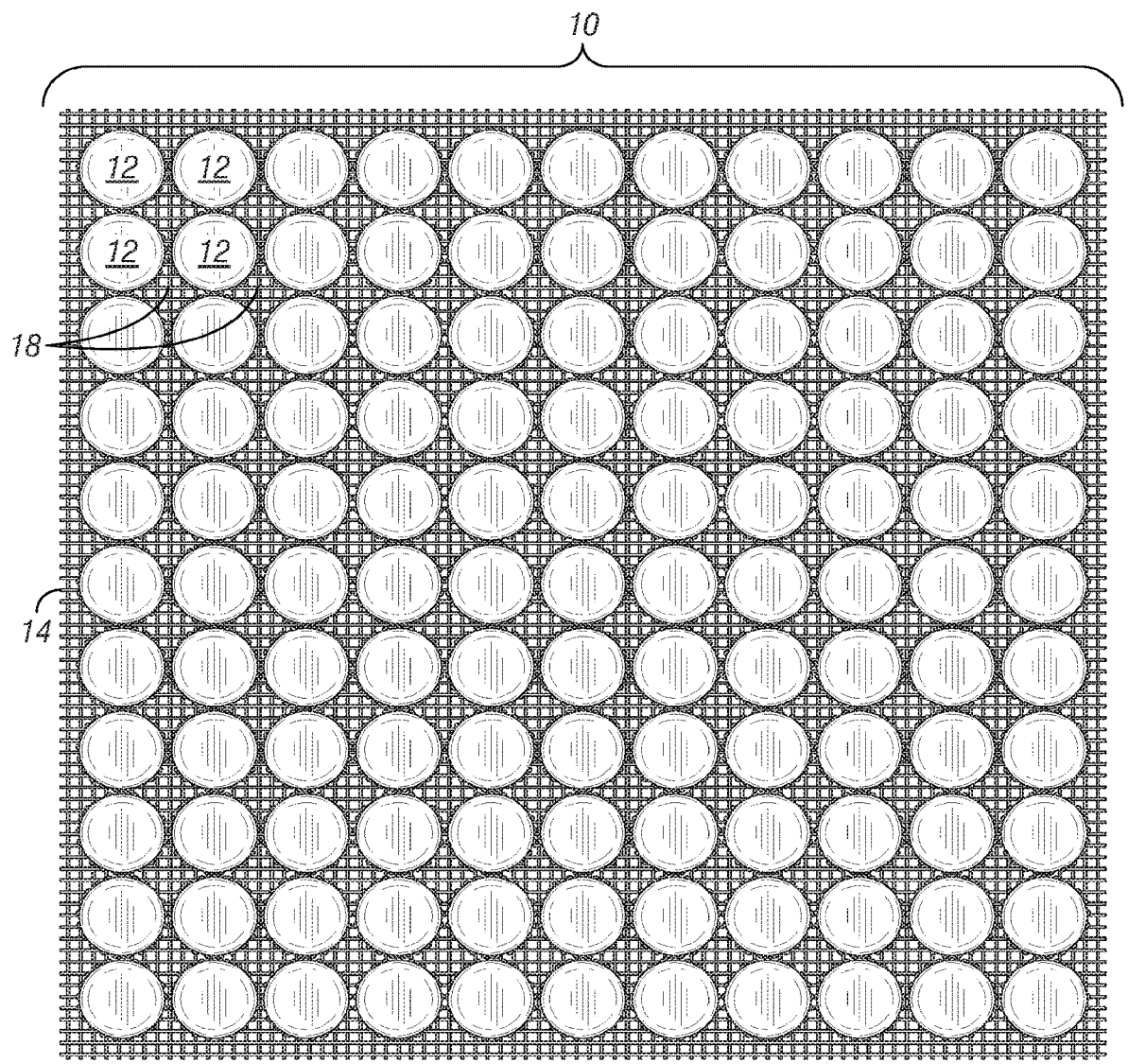
FIG. 2 illustrates the top view of the bottle cap backsplash of FIG. 1.
Figure 3:
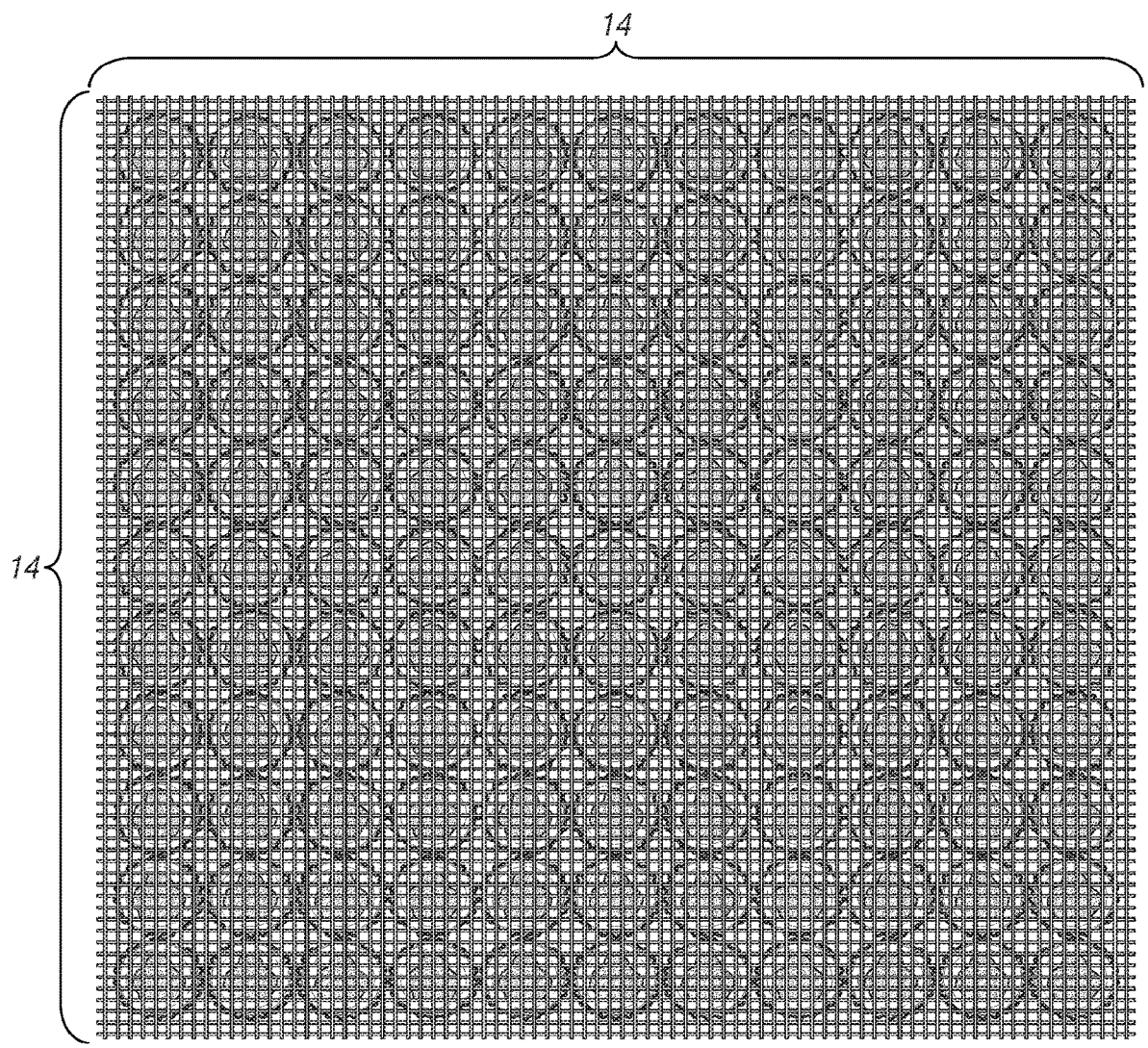
FIG. 3 is a view of the invention of FIG. 1.
Figure 4:
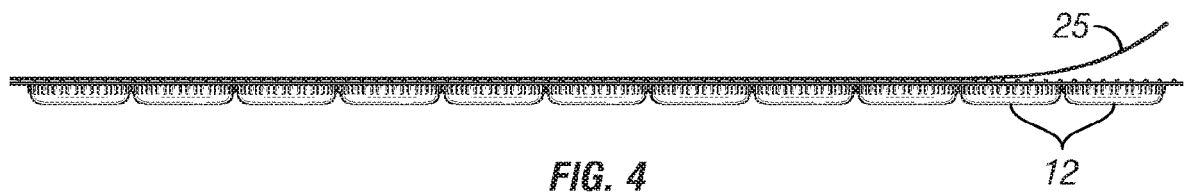
FIG. 4 is an inverted, horizontal side view of FIG. 1.
Figure 5:
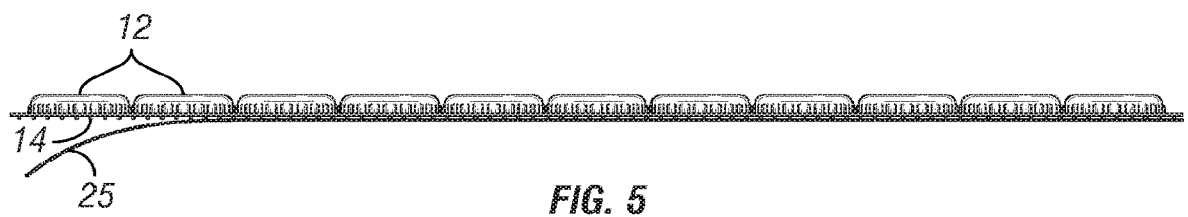
FIG. 5 is an upward facing, horizontal side view of FIG. 1.
Figure 6:
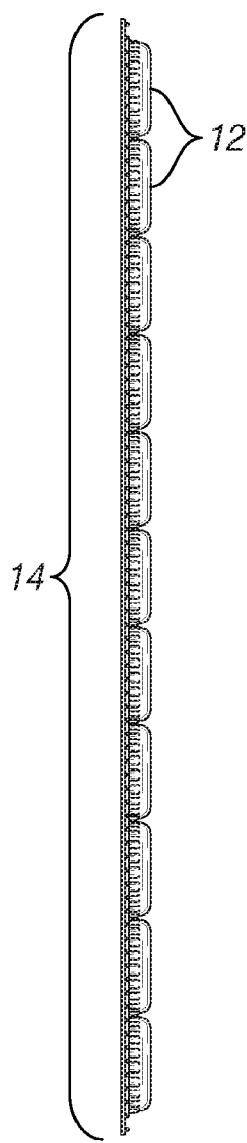
FIG. 6 is a vertical, right-facing side view of FIG. 1.
Figure 7:
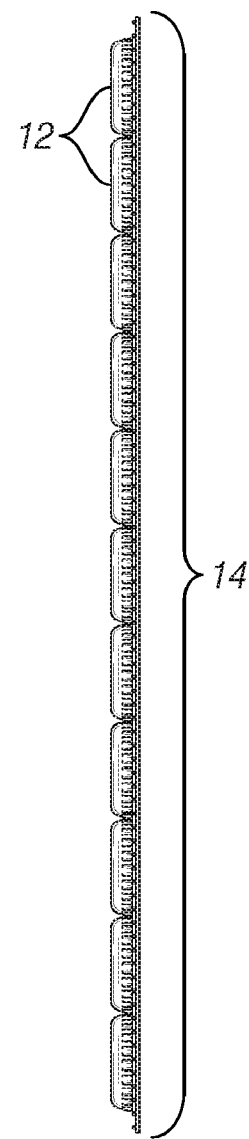
FIG. 7 is a vertical, left facing side view of FIG. 1.

Broadly, FIG. 1 displays one embodiment of the present invention which provides a bottle cap backsplash assembly 10 that is illustrative of the primary component of the bottle cap backsplash system that is utilized to adhere onto a woven mesh backing 14 a plurality of repurposed bottle caps 12 in a uniform and equally-spaced manner—a space 18 sufficient and capable of accepting the application of an acceptable quantity of grout (not shown). The bottle cap backsplash assembly 10 is then made to stick to an accepting vertical surface of a kitchen, wet-bar, bar or other decorative area (not shown) or the horizontal surface of a table top or bar (not shown).

The bottle cap backsplash assembly 10 itself is constructed of repurposed bottle caps 12 that are securely adhered to a sturdy, waterproof, woven mesh backing 14 via a commercially manufactured adhesive displaying an adhesion strength sufficient to allow the mesh to maintain each bottle cap 12 in a fixed position up to the point of permanent fixation upon a flat surface (not depicted). Equally, the woven mesh backing 14 is a made of a material that can withstand the application of adhesives, grout and bonding agents. Further, the woven mesh backing 14 expresses a durability that allows it to maintain its shape, as well as bottle cap 12 placement, throughout the shipping process which includes stacking of individual sheets, stacking of a multitude of pre-filled corrugated container, and movement during transport.

While the bottle cap backsplash assembly 10 can display any number of configurations and arrangements, the preferred embodiment exhibited in FIGS. 1-7 is of a square construct measuring approximately 11.75 inches on each side and a thickness of approximately 0.275 inch.

Each bottle cap backsplash assembly 10 sheet, while exhibited as the above mentioned 11.75 inch×11.75 inch square, can be sized and fit simply by cutting the mesh to any desired dimensions to suitably match any specified area. Once sized, the woven mesh backing 14 can be affixed to a prepared surface via one of two methods: (1) by the application of a commercially available adhesive or (2) by a pre-applied contact adhesive that is achieved in the manufacturing process prior to distribution and is protected from premature adhesion before installation via reversibly fixed release liner 25 (see FIGS. 4-5).

In addition to the aforementioned uniform construct of bottle cap 12 placement that is both linear and equally spaced, it should be evident to those skilled in the art that any number of arrangement and configurations may be accomplished via similar means to provide the end user with custom configurations that are non-uniform, non-linear and/or exhibiting spacing 18 between bottle caps 12 that result in an asymmetrical, irregular bottle cap 12 placement and design. Clearly, modifications as to design can be accomplished without departing from the spirt, scope and utility of the invention. To this end the consumer would have to ability to pre-order a design that is both distinctive and unique.

Figure 8:
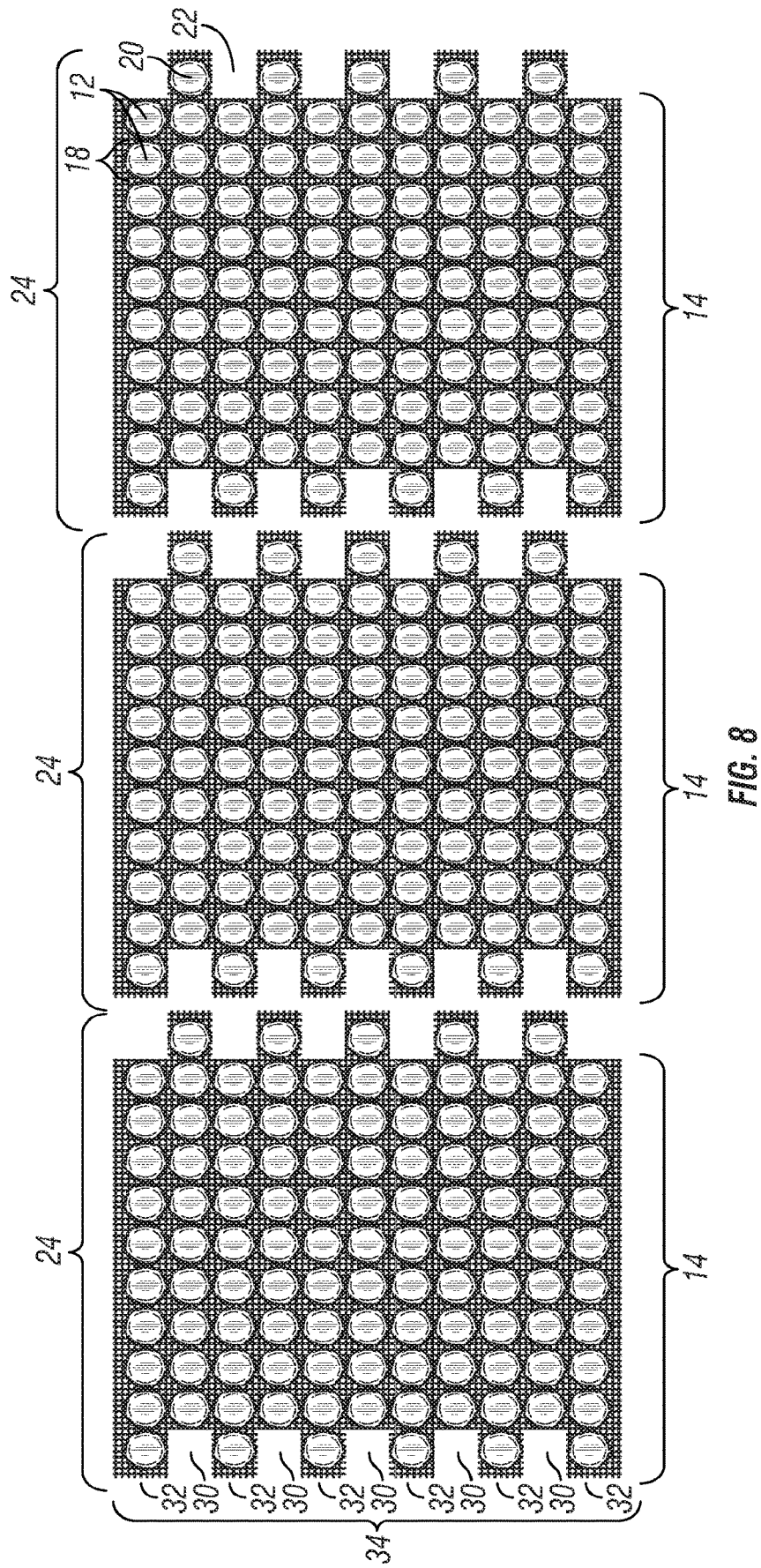
FIG. 8 is a top view in accordance with another embodiment of the invention.
Figure 9:
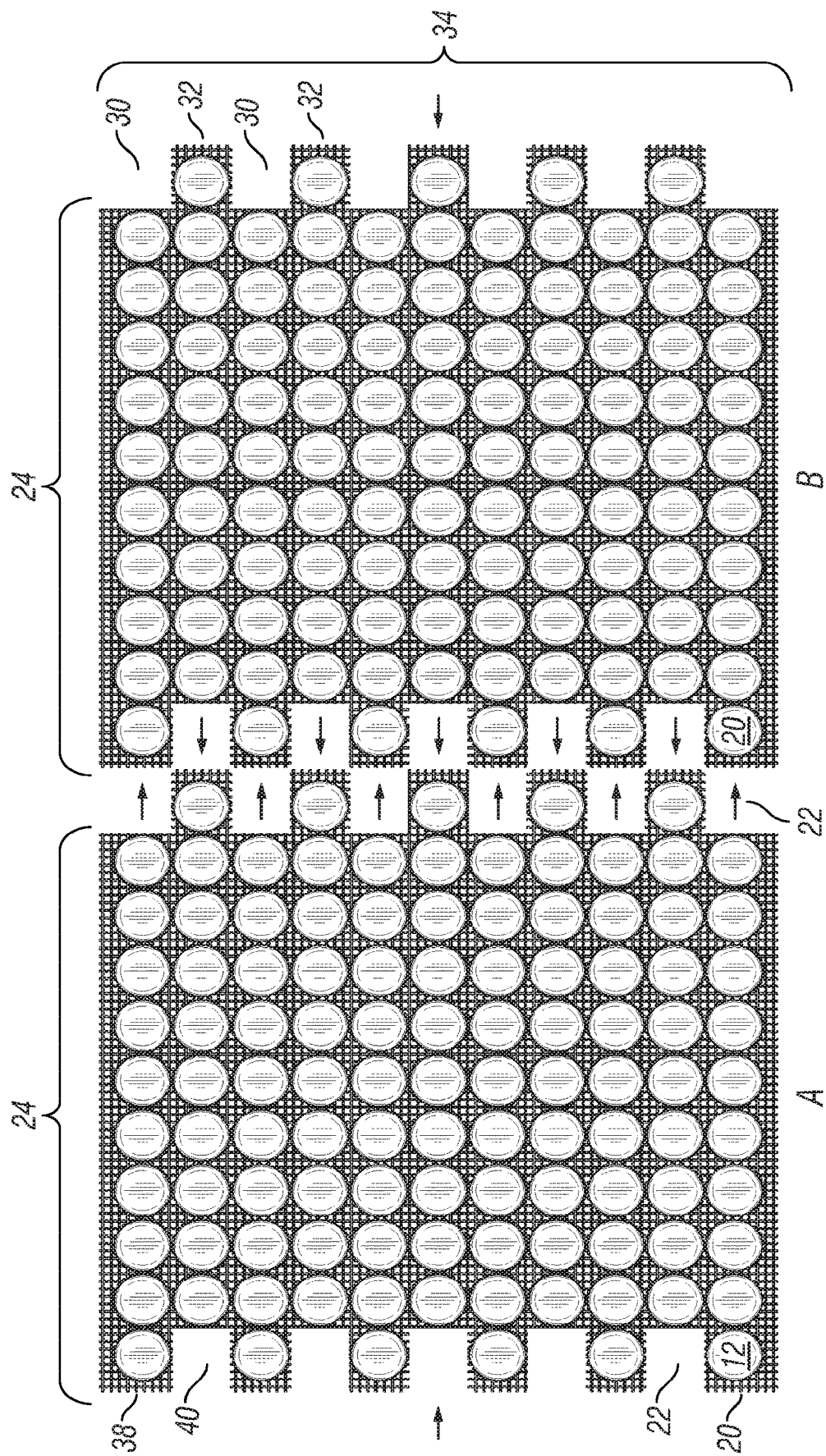
FIG. 9 is a top view of showing the interconnectivity of the invention of FIG. 8.

Turning now to FIGS. 8 and 9, there is depicted an alternative, modified version of the present invention where the square-type assembly has been augmented to provide an interlocking system of "tongue and groove" type fittings wherein the tongue protrusions 20 of one modified assembly sheet 24 is made to communicate with the groove indentions 22 of the adjacent modified assembly sheet 24 as displayed best in FIG. 9. The preferred embodiment of the modified assembly sheet 24 consists of equally spaced bottle caps 12 that are placed ten bottle caps across on a mesh backing 14 that is approximately 11.75 inches in length and 1.136 inches in width and is assembled in a one bottle cap staggered arrangement to create the aforementioned tongue protrusions 20 and groove indentions 22 in a plurality of rows (eleven rows as shown and described in FIGS. 8-9). Each row, 30 and 32 respectively, consists of dimensions 11.75 inches×1.136 inches and cumulatively all rows 30 and 32 are 12.5 inches across (designated 34). Individually, each tongue protrusion 20 measures 1.136 inches along edge 38 and 1 inch along edge 40.

Functionally, as illustrated in FIG. 9, each modified assembly sheet 24 A is made to fit into the corresponding features of modified assembly sheet 24 B to establish a uniform backsplash assembly that displays a continuity and congruity that is both purposeful in terms of structured, linear placement and visually pleasing.

It should be understood, of course, that the foregoing description is illustrative only and is not limited to the specific construction and arrangement as displayed and described and that the present invention representation relates to exemplary embodiments of the invention. Further, modifications as to position and placement may be made without departing from the spirit and scope of the invention. Accordingly, the invention is best described and defined as set forth in the following claims.

What is claimed is:

1. A method of installation of a non-adhesive bearing, bottle cap backsplash assembly comprising:
   properly cleaning a vertical support surface of foreign substances, dust, debris or oily or greasy matter,
   leveling the vertical support surface to zero,
   preparing exactly one assembly sheet by size and shape in accordance with the vertical area to be covered with the assembly sheet,
   dry fitting the non-adhesive bearing assembly sheet to the desired area,
   applying a thin set mortar to the vertical support surface,
   placing the assembly sheet to the predetermined vertical space matching the size of the assembly sheet,
   providing uniform pressure across the outward hieing assembly sheet sufficient to ensure adhesion of the assembly sheet to the prepared vertical surface,
   repeating the aforementioned process for all subsequent assembly sheets adequate to cover the entire vertical surface desired to be covered,
   grouting the entire assembly sheet spaces between bottle caps thus creating a bonding force across the depth of the assembly sheet,
   applying a second uniform pressure to ensure secure placement,
   sponging away all excess grout to expose only bottle cap faces,
   sealing the grout, and
   polishing the face of the bottle caps.

2. The method of claim 1, wherein tongue protrusions and corresponding groove indentions are utilized to ensure proper alignment.

3. The method of claim 2, wherein the backsplash assembly is adhered to a horizontal surface.

* * * * *